(12) United States Patent
Yseboodt et al.

(10) Patent No.: US 10,530,590 B2
(45) Date of Patent: Jan. 7, 2020

(54) FORCED BULK CAPACITOR DISCHARGE IN POWERED DEVICE

(71) Applicant: SIGNIFY HOLDING B.V., Eindhoven (NL)

(72) Inventors: Lennart Yseboodt, Retie (BE); Matthias Wendt, Würselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 78 days.

(21) Appl. No.: 15/577,412

(22) PCT Filed: May 18, 2016

(86) PCT No.: PCT/EP2016/061156
§ 371 (c)(1),
(2) Date: Nov. 28, 2017

(87) PCT Pub. No.: WO2016/188823
PCT Pub. Date: Dec. 1, 2016

(65) Prior Publication Data
US 2018/0176026 A1    Jun. 21, 2018

(30) Foreign Application Priority Data

May 28, 2015 (EP) ..................................... 15169716
May 29, 2015 (EP) ..................................... 15169945

(51) Int. Cl.
*G06F 1/26* (2006.01)
*H04L 12/10* (2006.01)
(Continued)

(52) U.S. Cl.
CPC ................. *H04L 12/10* (2013.01); *G05F 1/70* (2013.01); *G05F 3/02* (2013.01); *G06F 1/26* (2013.01);
(Continued)

(58) Field of Classification Search
CPC ............... G04L 12/10; H04L 12/40045; H04L 12/4625; H04L 49/351; G05F 1/70; G06F 1/26; G06F 3/02
See application file for complete search history.

(56) References Cited

U.S. PATENT DOCUMENTS 6,064,187 A  *  5/2000  Redl ....................... G05F 1/565
                                                    323/224
6,157,553 A  *  12/2000  Kranister .................. H02J 7/34
                                                    307/66

(Continued)

*Primary Examiner* — Volvick Derose
(74) *Attorney, Agent, or Firm* — Meenakshy Chakravorty (57) ABSTRACT

A method, computer program product and device for generating a power signal are provided. In a power distribution system (e.g. PoE), a device (2) (e.g. PD) comprising at least one capacitor (e.g. bulk capacitor) parallel to a load (26) of the device, is powered by a power supply (1) (e.g. PSE). The power supply (1) is arranged for powering the device (2) when at least a minimum current (e.g. MPS) is drawn by the device (2) from the power supply (1). The device (2) determines, by measuring the voltage over the at least one capacitor, whether the current is drawn (partially) from the at least one capacitor. In which case the device (2) is controlled to draw current such that at least a minimum current is drawn from the power supply (1) and the power supply (1) remains powering the device (2).

13 Claims, 8 Drawing Sheets

(51) Int. Cl.
  *H04L 12/40*   (2006.01)
  *H04L 12/46*   (2006.01)
  *G05F 1/70*    (2006.01)
  *G05F 3/02*    (2006.01)
  *H02J 3/02*    (2006.01)
  *G06F 1/3203*  (2019.01)
  *H04L 12/931*  (2013.01)

(52) U.S. Cl.
  CPC .......... *H02J 3/02* (2013.01); *H04L 12/40045* (2013.01); *H04L 12/4625* (2013.01); *G06F 1/3203* (2013.01); *H04L 49/351* (2013.01)

(56) References Cited

U.S. PATENT DOCUMENTS

| | | | | |
|---|---|---|---|---|
| 2003/0185026 A1* | 10/2003 | Matsuda | ............... | H02M 3/285 363/71 |
| 2004/0174149 A1* | 9/2004 | Agari | ............... | G05F 1/565 323/271 |
| 2009/0085586 A1* | 4/2009 | Anderson | ............... | G01R 27/16 324/705 |
| 2010/0072902 A1* | 3/2010 | Wendt | ............... | H05B 33/0818 315/161 |
| 2011/0043130 A1* | 2/2011 | Wendt | ............... | H05B 33/0806 315/291 |
| 2011/0285685 A1* | 11/2011 | Naito | ............... | H05B 33/0818 345/211 |
| 2012/0102341 A1 | 4/2012 | Hussain et al. | | |
| 2012/0223650 A1* | 9/2012 | Radermacher | ............... | H05B 37/0254 315/200 R |
| 2012/0274214 A1* | 11/2012 | Radermacher | ............... | F21V 29/02 315/113 |
| 2013/0154603 A1* | 6/2013 | Cerutti | ............... | G05F 3/02 323/312 |
| 2013/0200812 A1* | 8/2013 | Radermacher | ............... | H05B 33/0824 315/186 |
| 2013/0234620 A1* | 9/2013 | Wang | ............... | H05B 33/0815 315/298 |
| 2013/0342151 A1* | 12/2013 | Kurokawa | ............... | H02M 7/537 318/500 |
| 2014/0084681 A1 | 3/2014 | Vigna et al. | | |
| 2014/0252975 A1* | 9/2014 | Drakshapalli | ............... | H02M 3/33507 315/210 |
| 2014/0354166 A1* | 12/2014 | Yu | ............... | H05B 33/0818 315/201 |
| 2015/0042243 A1 | 2/2015 | Picard | | |
| 2015/0061633 A1* | 3/2015 | Marchand | ............... | G06F 1/00 323/299 |

* cited by examiner

FORCED BULK CAPACITOR DISCHARGE IN POWERED DEVICE

CROSS-REFERENCE TO PRIOR APPLICATIONS

This application is the U.S. National Phase application under 35 U.S.C. § 371 of International Application No. PCT/EP2016/061156, filed on May 18, 2016, which claims the benefit of European Patent Application No. 15169716.6, filed on May 28, 2015, and European Patent Application No. 15169945.1, filed on May 29, 2015. These applications are hereby incorporated by reference herein.

FIELD OF THE INVENTION

The present invention relates to devices arranged for being detachably coupled to a power supply in a power distribution system, and to methods and computer program products for being implemented on such devices.

BACKGROUND OF THE INVENTION

Power over Ethernet, PoE, is a technology used for providing power to devices over, typically, the same Ethernet cable that provides data connectivity. In recent developments PoE is used to power lighting devices, where each lighting device is a Powered Device, PD, according to the PoE standard (e.g. the IEEE 802.3af/at standards). Such a PD is powered by Power Sourcing Equipment, PSE, allowing for easy installation of a lighting system. It is desirable to make power distribution systems efficient such that power losses are small. A new PoE standard (i.e. the IEEE 802.3bt standard) is under development and increased power efficiency is one of the aspects this new standard will address.

Patent publication US 2013/154603 A1 discloses use of a current sense based Maintain Power Signature (MPS) such that a Powered Device (PD) can cause a Power Sourcing Equipment (PSE) to continue providing power to the PD.

SUMMARY OF THE INVENTION

The inventors have realized that in power distribution systems, an important aspect causing energy inefficiencies are minimum power consumption requirements, such as a requirement to provide a keep alive signal in a standby mode. For example, in PoE a MPS is created by a PD such that the PSE is aware that the port to which the PD is connected should remain powered. If, for example, a lighting device goes to a standby mode in which no light output is provided, yet where it should remain controllable (e.g. turn on when a command to that effect is received), then generating the keep alive signal (e.g. the MPS) generates power losses. For a single lighting device these might seem small, yet in a building with thousands of lighting devices these losses quickly add up.

When the minimum amount of current that a device needs to draw from a power supply in order for that power supply to remain providing power to the powered device is set to a very low value, then this is beneficial as the power losses decrease. However, at the same time this very low amount of current being drawn might not be detectable in the power distribution system at the end of the power supply. As an example, assume a PD is required to draw 10 mA for a period of 7 ms out of every 300 ms in order to prevent the PSE from shutting down the port to which the PD is connected. The PD can be arranged such that a 7 ms pulse of 10 mA is generated every 300 ms. When this current is drawn fully from the PSE as power source, then the PSE can detect this power consumption and will continue to provide power as long as this 7 ms pulse of 10 mA is repeated every 300 ms. Typically a PD comprises a capacitor which stores power and under certain conditions when a MPS signal is generated current is drawn from the PD capacitor instead of from the PSE. Two non-limiting examples are provided here. For the avoidance of doubt, the minimum current draw requirements provided here are examples of such requirements only.

As a first example, if the impedance of the capacitor to the MPS generating circuit in the PD is lower than the source resistance of the PSE, the pulse can initially be drawn from the capacitor instead of directly from the PSE. As a second example, if there is a (e.g. sudden) voltage drop in the power supplied by the PSE (e.g. from 54V to 52V), the voltage over the capacitor in the PD will be higher than the voltage as supplied by the PSE. The pulse is then drawn from the capacitor and no current is drawn from the PSE until the voltage over the capacitor has reached the lower voltage (52V in this example) as supplied by the PSE. As a result, in both of these examples, power drawn at the device (e.g. PD) side of the power distribution system complies with the minimum power consumption required for the power supply (e.g. PSE) to remain providing power, yet the power consumption as measured at the power supply side of the power distribution system would possibly not comply with minimum power consumption requirements as the power consumed by the device is at least partially sourced from one or more capacitors in the device (e.g. in the load, in the physical interface such as the Ethernet interface).

In a first aspect, what is claimed is a method for generating a power signal in a device in a power distribution system, the device comprising at least one capacitor parallel to a load of the device, the power distribution system comprising a power supply arranged for powering the device when at least a minimum current is drawn by the device from the power supply; the method comprising: measuring a voltage over the at least one capacitor while the device is drawing current, controlling the device to draw a current based on the measured voltage, wherein the device is controlled to draw a first current as long as the measured voltage is decreasing over time and subsequently draw a second current equal to or greater than the minimum current. For all practical purposes, a voltage decreasing over time can be measured based on a threshold—when the decrease over time drops below a threshold it is considered that the voltage is no longer decreasing over time.

When the voltage over the at least one capacitor (e.g. a bulk capacitor) is decreasing while current is drawn, this is an indication that the current is drawn at least partially from the capacitor. As a consequence, the current is not (directly) drawn from the power supply. Therefore, at the side of the power supply in the power distribution system the minimum current might not be drawn which is required for the power supply to remain powering the device (e.g. to keep the electrical connection open, to prevent an electrical or other disconnect, or to keep a power allocation of the power supply to the device). By controlling the device to draw a first current, a situation where the impedance of the capacitor in the device is lower than the resistance of the power supply and/or a situation where the voltage over the capacitor in the device will be higher than the voltage as supplied by the power supply can be overcome. When the impedance of the capacitor is lower than the resistance of the power supply, as current is drawn the voltage over the capacitor will drop until an equilibrium is reached. At that point, by controlling the device to draw a second current, current is drawn from the power supply. When the voltage over the capacitor is greater than the voltage over the power supply, as current is drawn the voltage over the capacitor will drop and until an equilibrium is reached. At that point, by controlling the device to draw a second current, current is drawn from the power supply. The second current drawn, which is drawn from the power supply, should, at least together with the first current drawn, meet the minimum current requirements for the power supply to remain powering the device. Drawing a current meeting such minimum current requirements as the second current complies with such minimum current draw requirements. In a practical implementation the same current is drawn as the first current and then continued as the second current. For example, an MPS pulse is generated and instead of a 7 ms pulse, a pulse is generated of 37 ms. After the first 30 ms (the first current), in this example, the equilibrium is reached and the final 7 ms (the second current) ensures that a sufficient minimum current is drawn from the PSE. In this example the first and the second current are a single current draw, such as a single pulse. The second current drawn can then comply with requirements set forth in the PoE standard for MPS (e.g. it has a duration of, what is referred to in the standard as, $T\_mps\_pd$). An assumption can be made that part of the first current drawn is drawn from the PSE and therefore in an embodiment the second current drawn is less than the minimum current required for the PSE to keep powering the PD.

The measuring of the voltage over the at least one capacitor while current is drawn takes place at least while the first current is drawn, in order to determine when the equilibrium is reached (i.e. when the measured voltage is no longer decreasing over time, or at least decreasing at less than a predetermined rate).

In an embodiment of the method, the first current is larger than the second current. This is beneficial as it increases the speed at which the equilibrium is reached. The first current draw can, for example, achieve the reaching of the equilibrium and the second current draw fulfills the requirements such that a minimum current draw is detectable at the side of the power supply in the power distribution system. In another embodiment, the second current is larger than the first current. The first current is the normal operating current (e.g. 2 mA, drawn by a microcontroller or due to losses) which will cause a slow decrease in capacitor voltage. When this voltage drop is measured (i.e. the voltage measurement takes place not during a MPS pulse, in this example, but while the normal operating current is drawn), the PD can self discharge using a higher current (e.g. 50 mA) to get rid of excess capacitor voltage, followed by an MPS pulse (e.g. 10 mA).
The higher current could be skipped (50 mA) and simply a longer MPS pulse can be used.

In further embodiments of the method, the power supply is arranged for powering the device when the at least a minimum current is drawn for a duration of at least a first time period within every second time period, and wherein the second current is equal to or greater than the at least a minimum current and the second current is drawn for at least the first time period. For example, the first current is a pulsed current and the duration of at least one pulse of the first current is greater than the first time period. As another example, the first current is a pulsed current and the current drawn during at least one pulse of the first current is greater than the at least a minimum current.

As an example, if the current drawn is a pulsed current then it can take several pulses before the current is no longer drawn from the capacitor. If one or more pulses are not detected at the power supply side of the power distribution system, the power supply can decide to, for example, disconnect the device. By drawing one or more larger pulses as a first current and a normal pulse as a second current, the larger pulses achieve the reaching of the equilibrium with increased speed and the normal pulse fulfills the requirements such that a minimum current draw is detectable at the side of the power supply in the power distribution system. Such a large pulse can comprise, for example, a pulse of extended duration or a pulse of greater amplitude. When the method is applied to a pulse generator, depending on the configuration of the pulse generator one of these can be easier to implement.

In yet another embodiment of the method, the method further comprises: measuring a current drawn by the load, wherein controlling the device to draw a current is performed only if the measured current is below a predetermined threshold. This is advantageous as minimum power requirements would be met when the device is in operation and the load is drawing sufficient current. In such a case, for example, no current pulses need to be generated and no voltage measuring over the capacitor needs to be performed. As another option, controlling the device to draw a current is performed only if the load is in a standby mode. Under the assumption that in an operational mode sufficient current is drawn for the power supply to remain powering the device, no additional current needs to be drawn.

In various embodiments the first and/or the second current are drawn by any one of: controlling the load to consume power, controlling a resistive component to consume power, or controlling a power store to store power. As an example, a Light Emitting Diode, LED, that is part of the load can be switched on to create the desired current draw and provide an indicator that the device remains powered. A resistor can be included in the device, such as in the physical interface of a PD, that is controlled (e.g. through a switch) to draw a current. The physical interface of the PD or the load in the device can comprise a further capacitor in which power can be stored. By controlling this capacitor, the first and second current can be drawn. There are various other ways in which the first and second current can be drawn in order to generate the power signal in the device.

In an especially advantageous embodiment, the method is applied to PoE. The device is a Powered Device, PD, and the power supply is a Power Sourcing Equipment, PSE, according to a Power-over-Ethernet, PoE, standard, and the PSE is arranged for powering the PD when a Maintain Power Signature, MPS, is detected. In a further embodiment the at least one capacitor in the PD is a bulk capacitor, the controller is arranged for generating a MPS, the first and the second current together comprise a single pulse, and the second current comprises a MPS. This allows a pulse generator in a PD to generate MPS pulses (e.g. 10 mA for 7 ms every 300 ms) and extend the duration of an MPS pulse when the voltage over the bulk capacitor drops (indicating that current is drawn from the bulk capacitor). For example, a pulse of 7 ms can be extended to 37 ms where in the first 30 ms the voltage over the bulk capacitor drops and then when an equilibrium is reached the final 7 ms ensure that the PSE is able to detect an MPS. Thus, once it is known that the current will be drawn from the MPS and not the bulk capacitor a current is drawn for a duration of at least, what is referred to in the MPS standard as, $T\_mps\_pd$.

In the upcoming 802.3bt standard for PoE, additional 'type' of PSE are distinguished. The minimum current that needs to be drawn from the PSE by a PD for the PSE to keep the connection to the PD open varies amongst the several type of PSE. In an embodiment of the method, the method further comprises determining the type of PSE the PD is receiving power from, and the device is controlled to draw current is based on the determined type of PSE. For example, for a Type 1 or Type 2 PSE the pulse drawn by the PD can be 10 mA whereas for a Type 3 or Type 4 PSE the pulse drawn is 16 mA for a Class 5-8 PD and 10 mA for a Class 1-4 PD.

In a second aspect, what is claimed is a computer program product for generating a power signal in a device in a power distribution system, the device comprising at least one capacitor parallel to a load of the device, the power distribution system comprising a power supply arranged for powering the device when at least a minimum current is drawn by the device from the power supply, the computer program product comprising computer program code for executing the method when the computer program code is run on a computer device. Such a computer program product can be run, as an example, as embedded software on a chip(set). As such, in a third aspect what is claimed is a digital or analogue circuitry arranged for being integrated in a Powered Device, PD, according to a Power-over-Ethernet, PoE, standard, the digital or analogue circuitry arranged for executing the method.

In a fourth aspect, what is claimed is a device for receiving power from a power supply in a power distribution system, the power supply arranged for powering the device when at least a minimum current is drawn by the device from the power supply, the device comprises: at least one load, at least one capacitor parallel to the at least one load, a controller arranged for generating a current draw, and a voltage measuring unit arranged for measuring the voltage over the at least one capacitor while the device is drawing current, wherein the controller is further arranged for controlling the device to draw a first current as long as the measured voltage is decreasing over time and subsequently draw a second current equal to or greater than the minimum current.

In an embodiment the device is a Powered Device, PD, and the power supply is a Power Sourcing Equipment, PSE, according to a Power-over-Ethernet, PoE, standard, wherein the PSE is arranged for powering the PD when a Maintain Power Signature, MPS, is detected, wherein the at least one capacitor is a bulk capacitor, wherein the controller is arranged for generating the MPS, and wherein the second current drawn complies with the MPS requirements of the relevant PoE standard (e.g. 10 mA drawn during 7 ms). Next to such a device comprising a PD, the device can also a chip(set) to be used in a PD.

It shall be understood that the (computer implemented) method, the computer program product and the device have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

According to the Power over Ethernet (PoE) Institute of Electrical and Electronics Engineers (IEEE) Standard 802.3af/at a powered device (PD) is powered by power sourcing equipment (PSE) via an Ethernet cable. The PSE is, for instance, a switch and the PD are, for example, internet protocol (IP) cameras, IP phones, wireless access points, luminaires, sensors, fans, et cetera. In accordance with the standard, the PSE is able to determine whether a cable is disconnected, connected to a non-PoE device, or connected to a PoE-compliant PD. This is accomplished in three phases (which follow the Idle state): Detection phase, Classification Phase, and 2-event Classification; after which the PD is powered (in the Operational state).

In the detection phase, the PSE detects whether a PD is connected. During the Detection phase, a PoE-compliant PD will provide a valid detection signature using a capacitor (50 nF-120 nF) and a resistor (25 kΩ; present only during the Detection phase). As an example, the PSE can apply two voltages in the range of 2.8V to 10V and measures corresponding currents to determine the presence of the signature resistor. Other methods are also allowed, such as sourcing current. In the classification phase, PSE and PD are distinguished as Type-1 complying with the IEEE 802.3af power levels (12.95 W), or Type-2 complying with the IEEE 802.3at power levels (25.5 W). Additionally the 802.3at standard provides a different method of determining the power classification. A Type-2 PSE has the option of acquiring PD power classification by performing 2-event classification (Layer 1) or by communicating with the PD (Layer 2). At the same time a Type-2 PD must be able to identify a Type-2 PSE and communicate over Layer 1 and 2. As part of the 2-event classification, the PSE provides a fixed voltage between 15.5V and 20.5V to the PD.

After determining a PD is connected (and the optional power classification) the PSE powers the PD until the PD no longer uses power. The standard specifies that if a PD requires little to no power, such as in a standby mode, the PD must generate a Maintain Power Signature (MPS). According to IEEE 802.3at, the MPS consists of two components, an AC MPS component and a DC MPS component. The PSE shall monitor the DC MPS component, the AC MPS component, or both. The AC MPS component is present when an AC impedance is detected at the power interface equal to or lower than 27 kΩ. If no MPS is detected by the PSE, the PSE may disconnect power to the PD. This prevents the PSE from providing power to a port that has been disconnected, which can in turn prevent a person touching such a port (or a cable connected to that port) from getting an electric shock. As another example, this can prevent damage to a non-PoE device being connected to a port of the PSE to which power is applied.

Currently discussions are coming up to use the PoE standard for all kinds of loads like lighting equipment (sensors, switches, light sources etc.) or entertainment appliances like active speakers, internet radios, DVD player, set-top boxes and even TV sets. A future standard is then needed that support higher power levels, such as levels up to 60 W or more per Cat5/6 connection. Such discussions are not only ongoing related to PoE, but also related to other (similar) standards such as the EMerge Alliance Occupied Space Standard or the USB Power Delivery standard. Together with this development of higher power devices being powered through such power distribution systems, there is also a development that the number of devices that is powered through these systems increases. There is therefore a need to develop a power distribution system with increased electrical efficiency.

The IEEE 802.3af/at standards define a power and data distribution system, which allows distributing power and data via a twisted-pair Ethernet cable. According to this standard, electrical consumers can be connected to a switch for receiving power from the switch and for exchanging data, wherein the switch comprises several ports and wherein to each port an electrical consumer can be connected. Ethernet is a family of computer networking technologies for local area networks (LANs). Ethernet was commercially introduced in 1980 and standardized in 1985 as IEEE 802.3 by the IEEE. Ethernet has largely replaced competing wired LAN technologies. The Ethernet standards comprise several wiring and signaling variants of the Open Systems Interconnection (OSI) physical layer in use with Ethernet. The original 10BASE5 Ethernet used coaxial cable as a shared medium. Later the coaxial cables were replaced by twisted pair and fiber optic links in conjunction with hubs or switches. The 10BASE-T Ethernet standard was designed for point-to-point links only, and all termination was built into the Ethernet device. Higher speed connections use initial auto-negotiation to negotiate about speed, half duplex and full duplex and master/slave. This auto-negotiation is based on pulses similar to those used by 10BASE-T devices to detect the presence of a connection to another device. When the auto-negotiation has finished, the devices only send an idle byte when there is no data send, to keep the link up.

Figure 1:
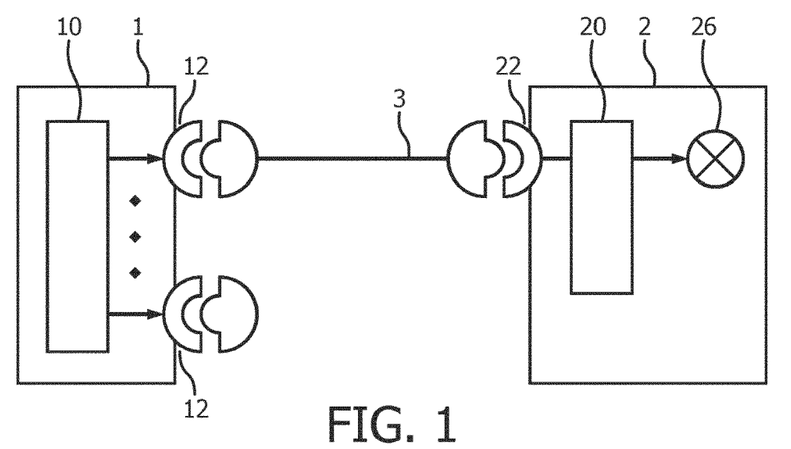
FIG. 1 shows schematically and exemplarily an embodiment of a power distribution system.

PoE is an active standard which allows a PSE to provide electrical energy to detached networked electrical consumers like routers, switches, printer spoolers, et cetera over their standard Ethernet cable connection. FIG. 1 shows a conventional architecture of a PoE based lighting system with a central power supply device (e.g. PSE) 1 with a plurality of PoE enabled output ports 12. For each load device 2 one of the output ports 12 gets wired by Cat5/6 cables 3 with connectors. In the example of FIG. 1, the load device 2 is a PoE lamp that incorporates a light source 26 and a PD controller/driver 20. Other load devices could also comprise fans, sensors or user interface devices like displays or switch panels. The supply device 1 comprises a PSU controller 10 which controls for each individual output port 12 the applied voltage and monitors for over-current with respect to the power request signaled by the PD controller 20 in each load device.

Figure 2:
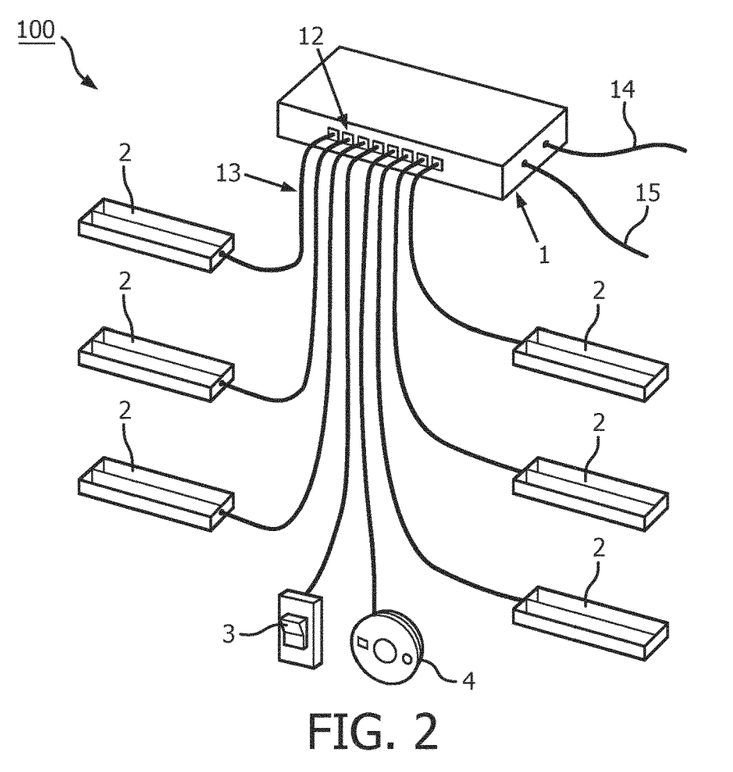
FIG. 2 shows schematically and exemplarily an embodiment of a power distribution system for a lighting application.

FIG. 2 shows schematically and exemplarily an embodiment of a power distribution system 100 for a lighting application, comprising a power sourcing device 1 for sourcing a power to powered devices 2, 3, and 4. The power sourcing device 1 comprises several ports 12 to which the powered devices 2, 3, and 4 are connected via Ethernet cables 13, which are adapted to convey the sourced power along with data. The power sourcing device 1 receives an input power via an electrical connection 15 that may be directly connected to a mains outlet (not shown in the figure), and the data may be received from another device (not shown in the figure), e.g., a switch, via another Ethernet cable 14. From the received power, a power supply unit 11 generates the power to be sourced to the powered devices 2, 3, and 5 via a power device manager 18. The data may be processed by a network data processor 19 before being sent to a respective powered device 2, 3, or 4 via the power device manager 18.

Here, the powered devices 2, 3, and 4 include luminaires 2, a switching element 3, and a presence sensor 4. These can be adapted such that the switching element 3 and/or the presence sensor 4 send dimming commands to the luminaires 2 via the switch 1 after the switching element 3 has been actuated by a person and/or the presence of a person has been detected by the presence sensor 4.

Figure 3:
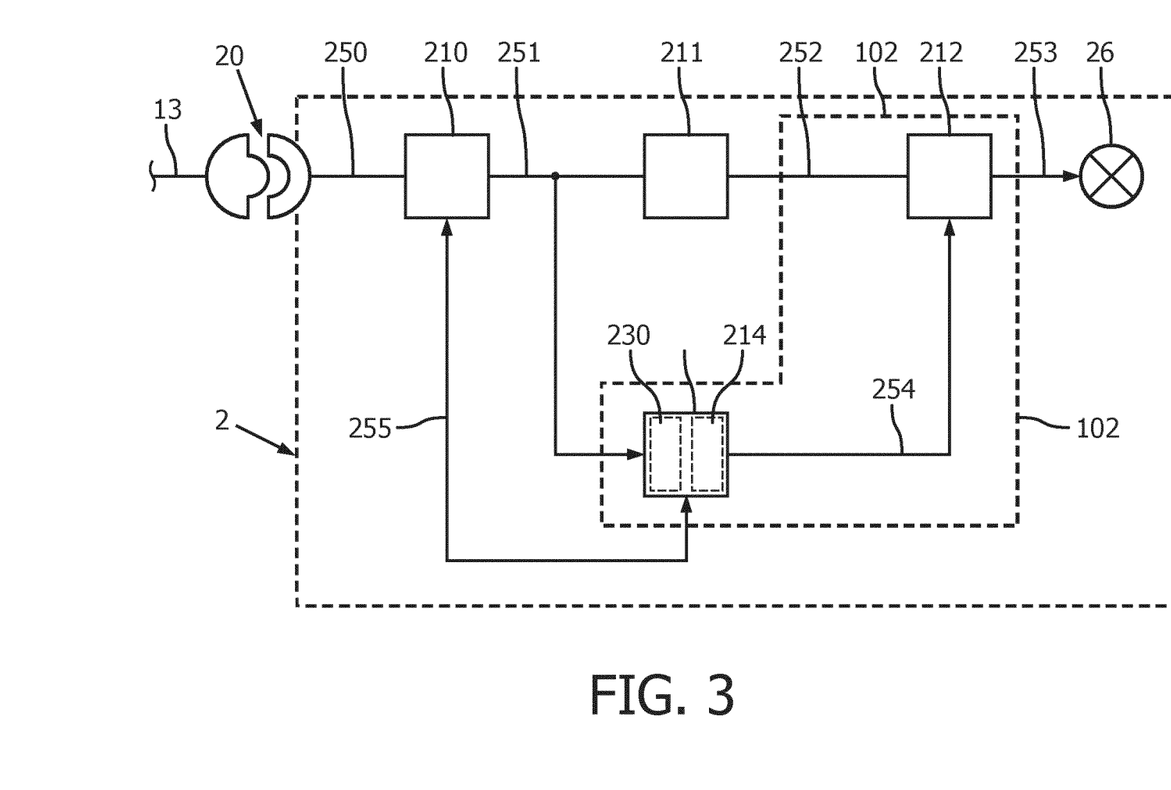
FIG. 3 shows schematically and exemplarily an embodiment of a powered device for a lighting application.

A luminaire 2 is schematically and exemplarily shown in more detail in FIG. 3. The luminaire 2 comprises an electrical load 26, in this embodiment, a light-emitting diode (LED). The luminaire 2 comprises an electrical load power providing unit 102 for generating from the power sourced by the power sourcing unit 1 an electrical load power and for providing the electrical load power to the electrical load 8. The Ethernet cable 13 is connected to a jack 20 of the luminaire 2. The conveyed power along with the data is provided to a power-data splitter 210 via a power-data path 250. The power-data splitter 210 splits the power and the data conveyed by the Ethernet cable 13. The split data is then conveyed further via the data path 255 and the split power is conveyed further via the power path 251. The power-data splitter 210 comprises, e.g., a magnetic circuit for splitting the power and data signals.

The luminaire 2 further comprises a powered device controller 211 for identifying the luminaire 2 in the PoE system (and optionally for negotiating a power class with the switch 1. The electrical load power providing unit 102 comprises an electrical load driver 212 for generating from the power sourced by the power sourcing device 1, which is received by the electrical load driver 212 via the powered device controller 211, an electrical load power and for providing the electrical load power to the LED 26 (and optionally an electrical load power controller 213 for determining the power level of the electrical load power such that the input current drawn by the powered device 2 from the power sourcing device 1 is maximized below a predefined upper input current threshold, e.g., the 0.6 A defined by the PoE standard 802.3at for power class 4, and for sending a power control signal being indicative of the determined power level via a control signal path 254 to the electrical load driver 212). The electrical load driver 212 is adapted to generate from the sourced power the electrical load power in accordance with the power control signal received from the electrical load power controller 213. The electrical load power is provided from the electrical load driver 212 to the LED 26 via an electrical load power path 253. The electrical load driver 212 is adapted to generate the electrical load power by generating a corresponding electrical load driving current for driving the LED 26. The electrical load power providing unit 102, in particular, the electrical load power controller 213 or the electrical load driver 212 may be adapted to low pass filter the control signal.

Figure 4A:
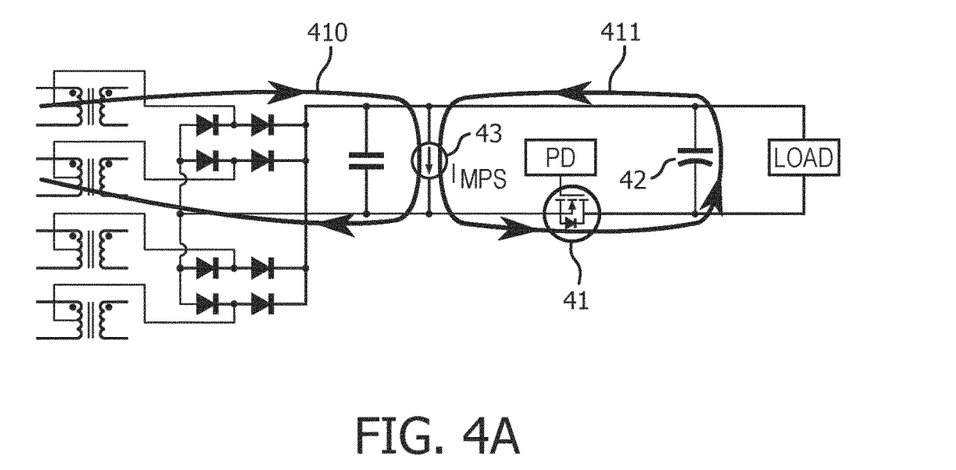
FIGS. 4A and 4B show schematically and exemplarily simplified diagrams of a PSE and a PD.
Figure 4B:
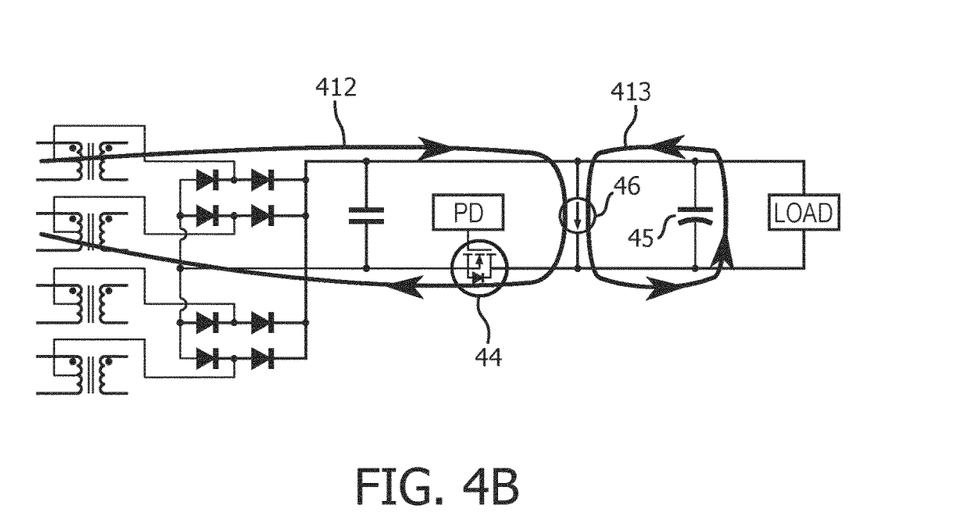

In FIGS. 4A and 4B a simplified PSE/PD schematic is shown to highlight the filtering element CBULK and the cable impedance (resistance+inductive value). In FIG. 4A the MPS signal generator 43 is positioned between the PD interface (comprising a hot swap FET 41) and the PSE; and in FIG. 4B the MPS signal generator 46 is positioned between the PD interface (comprising a hot swap FET 44) and the load. These diagrams illustrate the underlying problem, the existence of an undesirable current path 411, 413 where MPS is provided by the bulk capacitor. Whereas in the desirable current path 410, 412 the MPS is drawn from the PSE. When the MPS, or another current based on a minimum current requirement, is at least partially not drawn from the power supply (e.g. PSE) then when measured at the power supply side of the power distribution system the minimum current requirement might not be met. Such a requirement is set to allow, for example a PSE, to detect if a PD device becomes unplugged from the cable. In such an event, the PSE must quickly remove the voltage to avoid PoE voltages to be present on an open connector. In other words, the MPS is the minimum power signature a PD must draw to ensure that it remains powered.

When connected to Type 1 or Type 2 PSE, this MPS is defined to be 10 mA. This current is called IHold. This figure would put the lower bound power consumption at least on 50V×10 mA=500 mW. This lower bound limit is too high to achieve low standby, hence the standard also has the provision to duty cycle this current. The rule is that the IHold current only must be present for 75 ms out of every 325 ms period. This reduces the lower bound power consumption to 115 mW. The 802.3bt amendment is expected to introduce two new Types: Type 3 & Type 4. These will get a different MPS behavior than Type 1 and Type 2. Type 3 & 4 PDs are required to show the MPS for 7 ms out of every 300 ms period. The amount of current depends on the maximum PD power. If the power is lower or equal than 30 W (Class 4 power), the IHoldlevel is 10 mA, identical to the Type 1 & 2 specification. If the power is greater than 30 W (Class 5 and above) the required current is 16 mA.

For the PoE lighting application to succeed it is desirable that standby power is kept as low as possible. Therefore these updated minimum power usage requirements are favorable, yet such low power consumption pulses can inadvertently be drawn from, for example, the bulk capacitor CBULK at the PD side and are then not visible to the current sensing mechanism at the PSE side. This would lead the PSE to disconnect power from the PD which is very undesirable.

Figure 5:
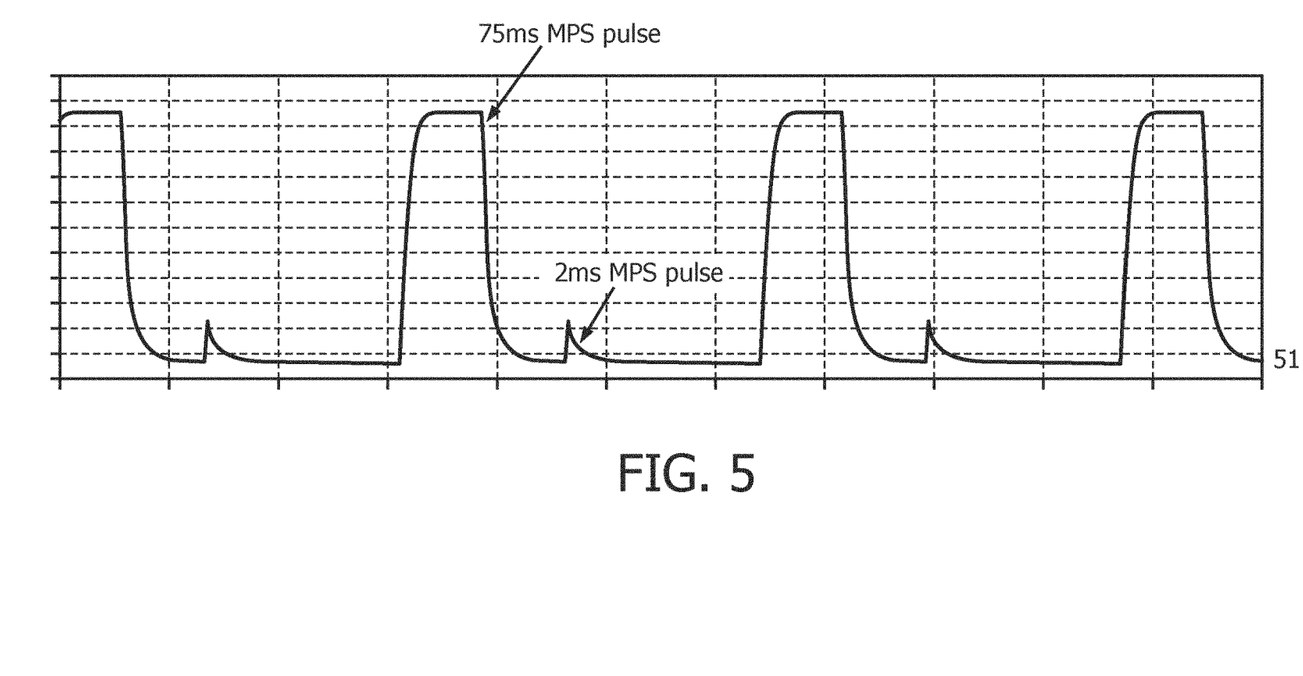
FIG. 5 shows schematically and exemplarily a Spice simulation of the current flow after the PD interface.

The effect that a pulse drawn by a device (e.g. PD) is not drawn from the power supply (e.g. PSE) can be caused for different reasons. As a first example, this effect is caused due to an impedance difference between the PSE voltage source and the bulk capacitor from the electrical viewpoint of the MPS generation circuit. If the impedance of the bulk capacitor is much lower than the source resistance of the PSE, the bulk capacitor will initially provide all the MPS current until a new DC equilibrium is reached between PSE source and bulk capacitor. For these short pulses most of the pulse can be sourced by the capacitor. This leads the PSE not to observe the MPS pulse and possible disconnect the PD. An LTspice simulation (see FIG. 5) shows that with a typical PD bulk capacitor of 220 µF the MPS pulse is almost invisible (i.e. the current draw 51 is negligible) at a PSE sense resistor. As a second example, this effect is caused due to a sudden drop in PSE voltage (voltage droop). PSE have a permissible voltage range of 57V-50V at the power interface. Due to increases in load (of other ports) it is common that PSE voltage drops. If PSE voltage drops and the PSE is connected to a PD with minimum power consumption, this can have the effect to reverse bias the input rectifier. At that moment the PD is operating from the power stored in the bulk capacitor until that capacitor is discharged below the PSE voltage and the input rectifier begins to conduct again. In this case the PSE will not observe the MPS and will disconnect the PD.

Figure 6:
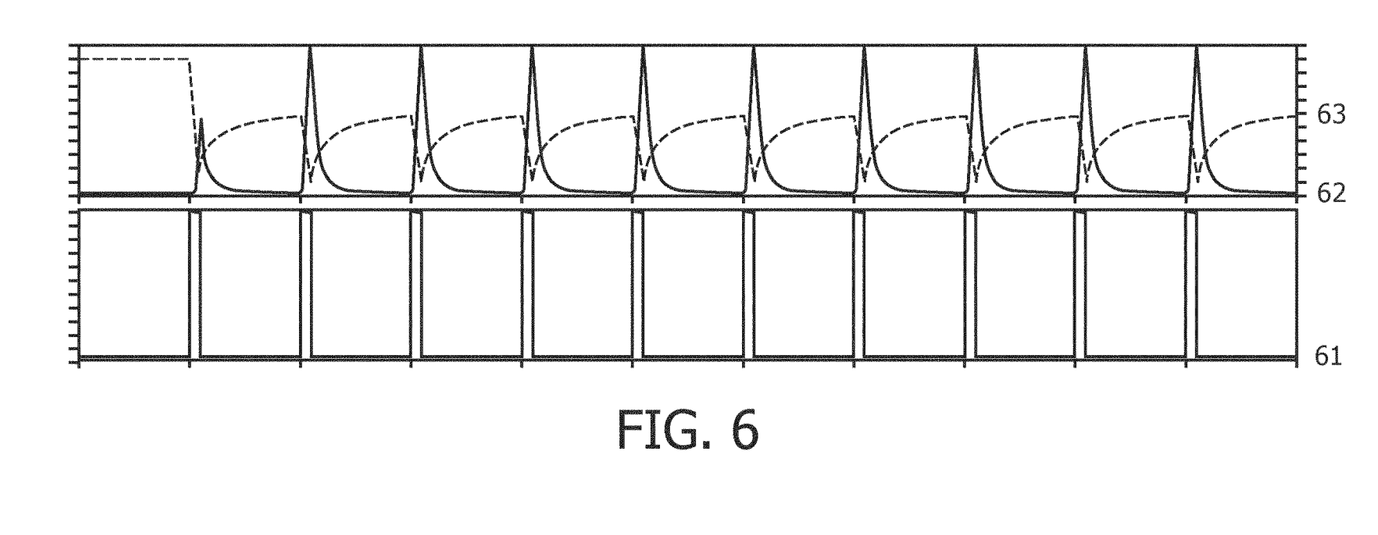
FIG. 6 shows schematically and exemplarily a Spice simulation of a first MPS current drawn at the PD and the observable current at the PSE.

In FIG. 6 a further Spice simulation is provided which shows the drawn MPS current at the PD 61, the observable current at the PSE 62 and the voltage over the bulk capacitor 63. This simulation uses the short MPS timings with an on time of 7 ms, which causes the PSE waveform to be distorted and reduced in amplitude.

Figure 7:
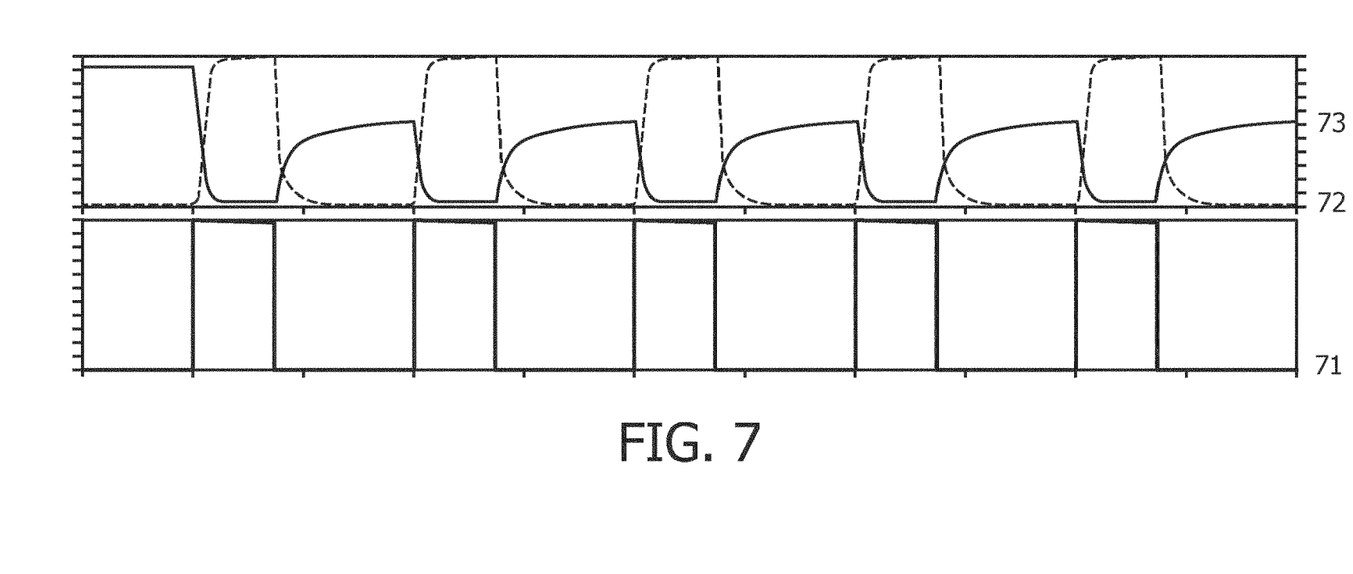
FIG. 7 shows schematically and exemplarily a Spice simulation of a second MPS current drawn at the PD and the observable current at the PSE.

In FIG. 7 yet a further Spice simulation is provided that shows the drawn MPS current at the PD 71, the observable current at the PSE 72 and the voltage over the bulk capacitor 73. This simulation uses the long MPS timings with an on time of 75 ms. Here we can see that the PSE waveform has deformed edges, but does reach a DC equilibrium. The bulk capacitor voltage is an inverted mirror copy of the PSE current.

Figure 8:
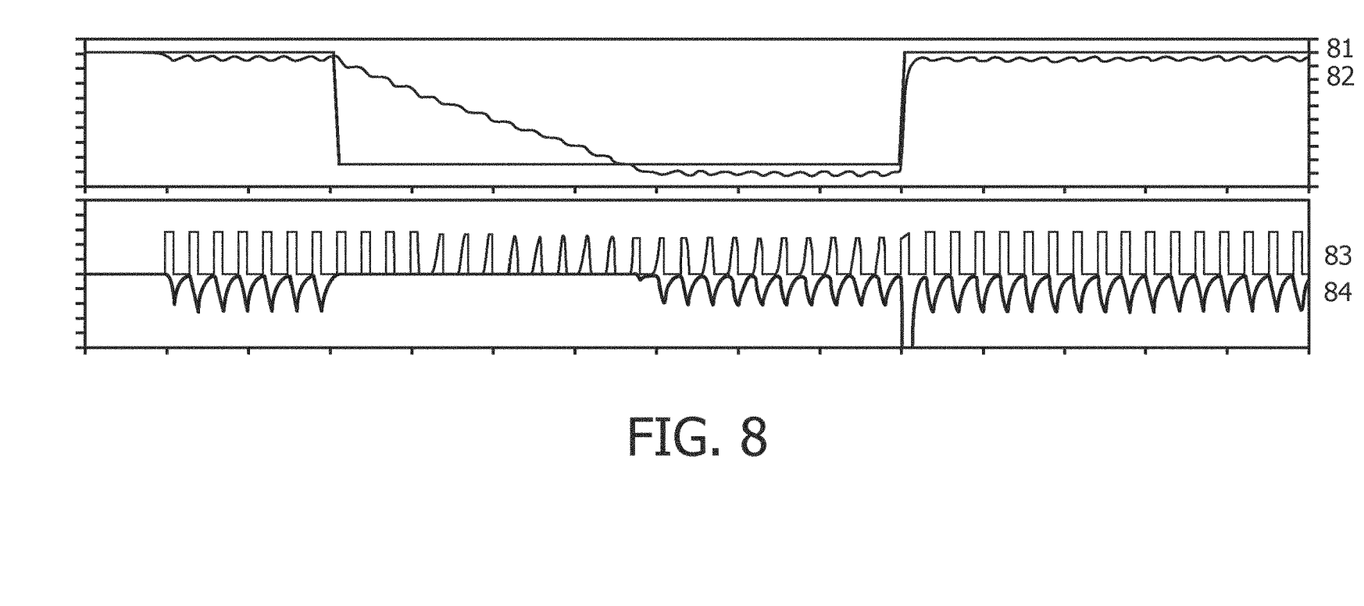
FIG. 8 shows schematically and exemplarily a Spice simulation showing the effect of a PSE voltage droop.

In FIG. 8 a Spice simulation is provided that shows the effect of PSE voltage droop. The PSE voltage 81 is shown, it transitions from 57V to 50V and back to 57V. Also shown is the voltage over the bulk capacitor 82. While MPS is drawn this voltage drop is on par with the MPS current. The MPS current on the PD side is shown 83 as well as the current as observed by the PSE 84. While the pulses are filtered and reduced in amplitude during the period of high PSE voltage, these pulses completely disappear after the voltage has dropped to 50V and only reappear later after the bulk capacitor has discharged sufficiently.

Figure 9:
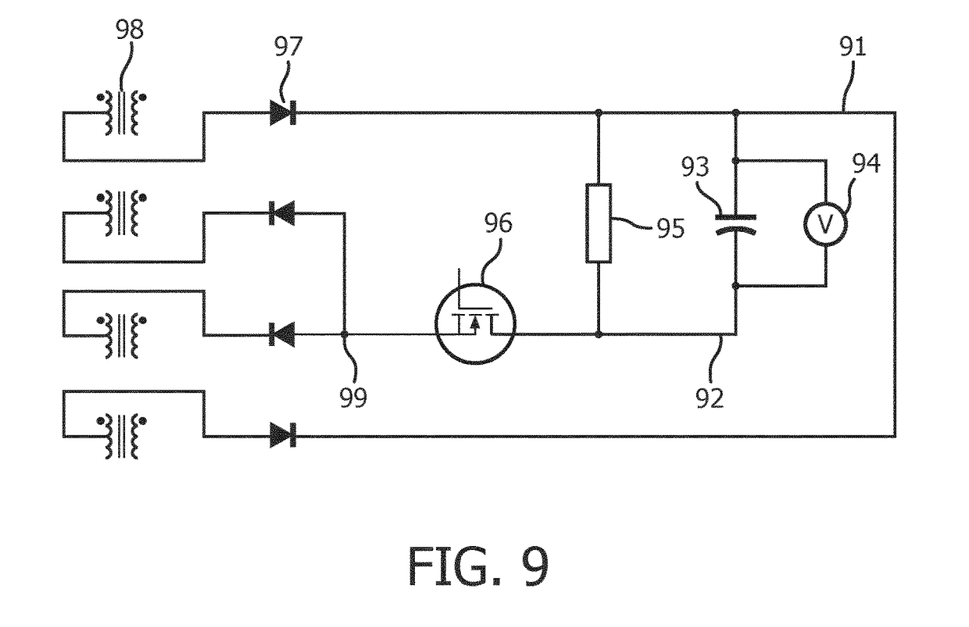
FIG. 9 shows schematically and exemplarily a simplified diagram applying the teaching of this application.

In FIG. 9 a device (e.g. PD) is shown for receiving power from a power supply (e.g. PSE). It comprises a positive rail 91 (after rectifier), a negative switched rail 92, a bulk capacitor 93, a voltage measurement over bulk capacitor 94, a keep alive signal (e.g. MPS) generating device 95, a hot swap switch 96 (e.g. MOSFET), an input rectifier 97 (please note that for simplicity only the conducting diodes are drawn), PoE Ethernet transformers 98, and a negative unswitched rail 99. In this example, the MPS generating impedance 95 can be located before 99 or after 92 the hot swap (96) FET and it is not required to turn off the hot swap while drawing MPS.

A PD is responsible for meeting the MPS requirements on the PSE side. A measurement of the PD voltage can be used to determine if the MPS current is drawn from the cable side (i.e. the power supply side, the PSE side) rather than the bulk capacitor (i.e. the device side, the PD side) of the power distribution system. During an MPS pulse the PD will measure the voltage of the bulk capacitor. As long as this voltage is dropping and has not reached a stable value the PD should continue drawing the MPS current. As soon as the voltage has reached a stable value the PD should continue the current for at least the minimum required time (7 ms when connected to a Type 3 or 4 PSE, and 75 ms when connected to a Type 1 or Type 2 PSE).

It is possible to build a PD interface chip that has this capability built in and generates automatically correctly timed MPS pulses. Alternatively this can be built into the PD application (e.g. a microcontroller that handles MPS) and has an A/D converter to read the PD bulk capacitor voltage. It is also possible to use a differentiator which takes the bulk capacitor voltage as input. Since a steady state condition is looked for, a zero voltage on the differentiator indicates that a DC equilibrium has been reached and the drawn current is sourced by the PSE.

In this document, a method, computer program product and device are presented that allows a power consuming device (e.g. a PD) to detect if it is drawing current from its own (bulk) capacitor or from a power supply source (e.g. a PSE). This allows the device to draw correct amount of power such that a minimum power consumption is detectable at the power supply side of the power distribution system. This allows, for example, for the generation of a correct MPS such that the PD avoids being disconnected by the PSE.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A method for generating a power signal in a device in a power distribution system, the device comprising at least one capacitor parallel to a load of the device, the power distribution system comprising a power supply arranged for powering the device only when at least a minimum current is drawn by the device from the power supply for a duration of at least a first time period; the method comprising:
   measuring a voltage over the at least one capacitor while the device is drawing current,
   controlling the device to draw a first current as long as the measured voltage over the at least one capacitor is decreasing over time, and
   controlling the device, after the measured voltage ceases decreasing over time, to draw a second current equal to or greater than the minimum current, wherein the second current is drawn for at least the first time period such that the power supply continues to supply power to the device, wherein the first current is a pulsed current and the duration of at least one pulse of the first current is equal to or greater than the first time period.

2. The method according to claim 1 wherein the first current is larger than the second current.

3. The method according to claim 1 wherein the first current is a pulsed current and the current drawn during at least one pulse of the first current is greater than the at least a minimum current.

4. The method according to claim 1, wherein the method further comprises:
   measuring a current drawn by the load, wherein controlling the device to draw a current is performed only if the measured current is below a predetermined threshold.

5. The method according to claim 1, wherein controlling the device to draw a current is performed only if the load is in a standby mode.

6. The method according to claim 1 wherein the first and/or the second current are drawn by any one of: controlling the load to consume power, controlling a resistive component to consume power, or controlling a power store to store power.

7. The method according to claim 1 wherein the device is a Powered Device, PD, and the power supply is a Power Sourcing Equipment, PSE, according to a Power-over-Ethernet, PoE, standard, wherein the PSE is arranged for powering the PD when a Maintain Power Signature, MPS, is detected.

8. The method according to claim 7, wherein the at least one capacitor is a bulk capacitor of the PD, wherein the controller is arranged for generating a MPS, wherein the first and the second current together comprise a single pulse, and wherein the second current comprises a MPS.

9. The method according to claim 7, the method further comprising:
   determining the type of PSE the PD is receiving power from, wherein controlling the device to draw a current is further based on the determined type of PSE.

10. A computer program product arranged for generating a power signal in a device in a power distribution system, the device comprising at least one capacitor parallel to a load of the device, the power distribution system comprising a power supply-arranged for powering the device when at least a minimum current is drawn by the device from the power supply, the computer program product comprising computer program code for executing the method of claim 1 when the computer program code is run on a computer device.

11. An analogue or digital electronic circuit for being integrated in a Powered Device, PD, according to a Power-over-Ethernet, PoE, standard, the electronic circuit arranged for executing the method of claim 1.

12. A device arranged for receiving power from a power supply in a power distribution system, the power supply arranged for powering the device only when at least a minimum current is drawn by the device from the power supply for a duration of at least a first time period, the device comprising:
   at least one load,
   at least one capacitor parallel to the at least one load,
   a controller arranged for generating a current draw, and
   a voltage measuring unit arranged for measuring the voltage over the at least one capacitor while the device is drawing current,
   wherein the controller is further arranged for controlling the device to draw a first current as long as the measured voltage over the at least one capacitor is decreasing over time and to subsequently draw, after the measured voltage ceases decreasing over time, a second current equal to or greater than the minimum current, such that the power supply continues to power the device, wherein the first current is a pulsed current and the duration of at least one pulse of the first current is equal to or greater than the first time period.

13. A device according to claim 12, wherein the device is a Powered Device, PD, and the power supply is a Power Sourcing Equipment, PSE, according to a Power-over-Ethernet, PoE, standard, wherein the PSE is arranged for powering the PD when a Maintain Power Signature, MPS, is detected, wherein the at least one capacitor is a bulk capacitor, wherein the controller is arranged for generating a MPS, wherein the first and the second current together comprise a single pulse, and wherein the second current comprises a MPS.

\* \* \* \* \*